(12) United States Patent
Milburn

(10) Patent No.: US 9,267,688 B2
(45) Date of Patent: Feb. 23, 2016

(54) HEAD PART OF AN ANNULAR COMBUSTION CHAMBER

(75) Inventor: Richard G. Milburn, Nottingham (GB)

(73) Assignee: ROLLS-ROYCE plc, London (GB)

(\*) Notice: Subject to any disclaimer, the term of this patent is extended or adjusted under 35 U.S.C. 154(b) by 955 days.

(21) Appl. No.: 13/450,863

(22) Filed: Apr. 19, 2012

(65) Prior Publication Data

US 2012/0272661 A1    Nov. 1, 2012

(30) Foreign Application Priority Data

Apr. 28, 2011    (GB) .................................... 1107090.1

(51) Int. Cl.
*F23R 3/10*    (2006.01)
*F23R 3/28*    (2006.01)
*F23R 3/50*    (2006.01)

(52) U.S. Cl.
CPC . *F23R 3/10* (2013.01); *F23R 3/283* (2013.01); *F23R 3/50* (2013.01); *F23R 2900/00005* (2013.01); *F23R 2900/00012* (2013.01); *F23R 2900/03041* (2013.01); *Y02T 50/675* (2013.01); *Y10T 29/49323* (2015.01)

(58) Field of Classification Search
CPC .............. F23R 3/002; F23R 3/10; F23R 3/60; F23R 3/50; F23R 2900/00012; F23R 3/283; F23R 2900/03041; F05D 2240/55; Y10T 29/49323
See application file for complete search history.

(56) References Cited

U.S. PATENT DOCUMENTS

| | | | | |
|---|---|---|---|---|
| 5,894,732 A * | 4/1999 | Kwan | ...................... | F23R 3/283 60/748 |
| 5,956,955 A | 9/1999 | Schmid | | |
| 5,996,335 A | 12/1999 | Ebel | | |
| 6,035,645 A * | 3/2000 | Bensaadi | .................. | F23R 3/14 60/742 |
| 6,314,739 B1 * | 11/2001 | Howell | ................. | F01D 11/005 60/748 |
| 7,246,494 B2 * | 7/2007 | Currin | ........................ | F23R 3/14 60/748 |
| 2008/0236169 A1 | 10/2008 | Hawie et al. | | |
| 2008/0282703 A1 | 11/2008 | Morenko et al. | | |
| 2009/0133378 A1 * | 5/2009 | Gruschka | ................ | F23D 14/78 60/39.83 |
| 2010/0326078 A1 | 12/2010 | Pieussergues et al. | | |

FOREIGN PATENT DOCUMENTS

EP    1 975 514 A2    10/2008

OTHER PUBLICATIONS

British Search Report issued in British Application No. GB1107090.1 on Aug. 17, 2011.

\* cited by examiner

*Primary Examiner* — Phutthiwat Wongwian
*Assistant Examiner* — Stefan Ibroni
(74) *Attorney, Agent, or Firm* — Oliff PLC

(57) ABSTRACT

A head part of an annular combustion chamber for a gas turbine, the head part comprising: an end wall with a passage opening for accommodating a burner, the end wall comprising a back side which faces towards the combustion chamber; a burner collar adapted to fit within the passage opening and receive the burner, the burner collar comprising a protruding portion radially protruding from an outer surface of the burner collar; and a ring member for receiving the protruding portion of the burner collar; wherein the head part of the annular combustion chamber is configured such that in an installed configuration a radially outer portion of the ring member engages with the end wall and a radially inner portion of the ring member receives the protruding portion of the burner collar.

14 Claims, 2 Drawing Sheets

HEAD PART OF AN ANNULAR COMBUSTION CHAMBER

CROSS-REFERENCE TO RELATED APPLICATIONS

This application is based upon and claims the benefit of priority from British Patent Application Number 1107090.1 filed 28 Apr. 2011, the entire contents of which are incorporated by reference.

BACKGROUND OF THE INVENTION

1. Field of the Invention

The present disclosure relates to a head part of an annular combustion chamber and particularly but not exclusively relates to a head part of an annular combustion chamber for a gas turbine.

The operation of gas turbine engines is relatively well known and, as will be appreciated, requires presentation of fuel for combustion in order to generate thrust. In order to present that fuel, a fuel spray nozzle or burner is required. A plurality of burners may be provided about the annulus of an annular combustion chamber.

2. Description of the Related Art

Referring to FIG. 1, which shows a previously-proposed arrangement, the fuel burner (not shown) is typically located within an end wall or meter panel 10 such that the fuel spray is appropriately presented within the combustor parts of the gas turbine engine. It will be understood that the combustor parts of a gas turbine engine will generate significant heat and therefore thermal stressing as well as vibration and other factors may create significant wear upon the mountings for the spray nozzle. In such circumstances a burner collar 30 is generally provided within the end wall 10 which ensures that the fuel spray nozzle is appropriately presented. A heat shield 20 is also provided to protect the end wall 10 from the hot burner gases and from an unacceptably high radiation effect. Furthermore, upon repair and overhaul it is generally easier to replace the heat shield 20 rather than the end wall 10 within the gas turbine engine.

In the previously-proposed arrangement shown in FIG. 1, the burner collar 30 is held between first and second location rings 34, 36, which are in turn held in place between the heat shield 20 and a protruding portion 12 of the end wall 10. The heat shield 20 is fastened to the end wall 10 to secure the arrangement.

The first location ring 34 is provided between the burner collar 30 and end wall 10. The end wall 10 may be cast and the back side of the end wall (i.e. the side facing the combustion chamber) may not be machined smooth. The first location ring 34 therefore provides a flat surface for the burner collar 30 to rest on. The location rings 34, 36 may be laser cut or machined.

The protruding portion 12 of the end wall 10 first extends away form the combustion chamber side of the end wall 10 and then radially inwardly. Accordingly, the protruding portion 12 of the end wall 10 provides a surface set back from the remainder of the end wall 10 for the first location ring 34 to rest on. The protruding portion 12 of the end wall 10 is cast integral with the remainder of the end wall 10.

Other examples of other previously-proposed arrangements are shown in U.S. Pat. No. 5,996,335, EP1975514, U.S. Pat. No. 5,956,955 and U.S. Pat. No. 5,894,732.

The protruding portion 12 of the end wall 10 adds cost, weight and complexity to the end wall 10 casting. Furthermore, the positional tolerances achievable with a cast surface require that the end wall 10 protruding portion 12 is thicker and heavier than its function requires. This additional weight is disadvantageous particularly in the case of a jet engine gas turbine.

The present disclosure therefore seeks to address these issues.

OBJECTS AND SUMMARY OF THE INVENTION

According to a first aspect of the present invention there is provided a head part of an annular combustion chamber for a gas turbine, the head part comprising: an end wall with a passage opening for accommodating a burner, the end wall comprising a back side which faces towards the combustion chamber; a burner collar adapted to fit within the passage opening and receive the burner, the burner collar comprising a protruding portion radially protruding from an outer surface of the burner collar; and a ring member for receiving the protruding portion of the burner collar on a back side of the ring member; wherein the head part of the annular combustion chamber is configured such that in an installed configuration a radially outer portion of the ring member engages with the back side of the end wall whilst a radially inner portion of the ring member engages the protruding portion of the burner collar. The radially inner portion of the ring member may be set back from the radially outer portion of the ring member. The radially inner portion may be set back with respect to the back side of the end wall.

The radially outer and inner portions of the ring member may be defined with respect to an axis of the end wall passage opening.

The diameter of the end wall passage opening may be greater than the burner collar protruding portion diameter.

The head part may further comprise a heat shield covering the back side of the end wall. The heat shield may comprise an opening for accommodating a burner and which corresponds to the passage opening in the end wall.

The ring member may be machined to have a smooth surface for receiving the protruding portion of the burner collar. The ring member may comprise one or more openings. The openings may be adapted to minimise the weight of the ring member and/or provide cooling air, e.g. to the heat shield.

The head part may comprise a further ring member. The further ring member may be disposed between the protruding portion of the burner collar and the heat shield. The heat shield may comprise one or more protruding portions configured to hold the further ring member against the protruding portion of the burner collar and thus the burner collar against the end wall.

The end wall may comprise a recess on the back side of the end wall and adjacent to the passage opening. The recess may be configured to engage the radially outer portion of the ring member.

In the installed configuration the protruding portion of the burner collar may be in direct contact with the ring member.

The protruding portion of the burner collar may extend about the perimeter of the burner collar. The protruding portion of the burner collar may define an annular rim.

The burner collar may be insertable into the passage opening from the combustion chamber side of the end wall.

The ring member and/or burner collar may be configured to permit relative radial movement between the burner collar and the end wall. For example, the diameter of the end wall passage opening may be greater than the diameter of the burner collar protruding portion.

A combustion chamber may comprise the above-mentioned head part of the annular combustion chamber. A gas turbine engine may comprise the above-mentioned head part of the annular combustion chamber.

According to a second aspect of the present invention there is provided a method of installing a burner collar of a head part of an annular combustion chamber for a gas turbine, the head part comprising: an end wall with a passage opening for accommodating a burner; the burner collar adapted to fit within the passage opening and receive the burner, the burner collar comprising a protruding portion radially protruding from an outer surface of the burner collar; and a ring member for receiving the protruding portion of the burner collar on a back side of the ring member; wherein the method comprises: engaging the back side of the end wall with a radially outer portion of the ring member; and engaging the protruding portion of the burner collar on the radially inner portion of the ring member. The radially inner portion of the ring member may be set back from the radially outer portion of the ring member with respect to the back side of the end wall.

BRIEF DESCRIPTION OF THE DRAWINGS

For a better understanding of the present disclosure, and to show more clearly how it may be carried into effect, reference will now be made, by way of example only, to the accompanying drawings, in which.

DETAILED DESCRIPTION OF THE PREFERRED EMBODIMENTS

Figure 1:
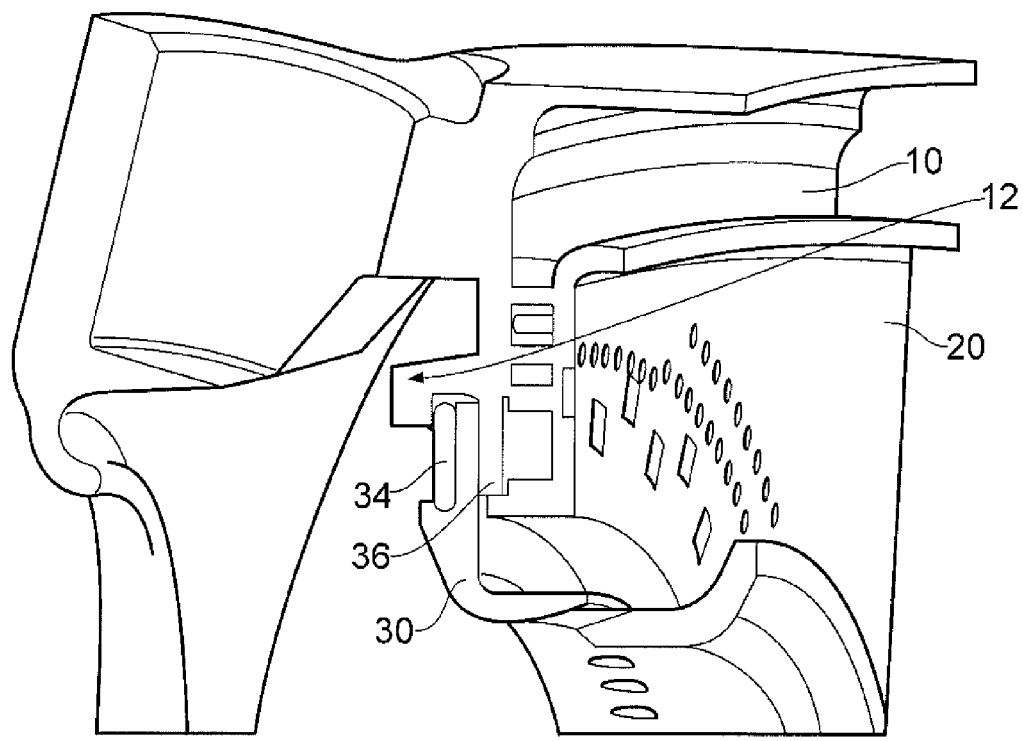
FIG. 1 shows a previously-proposed head part of an annular gas turbine combustion chamber.
Figure 2:
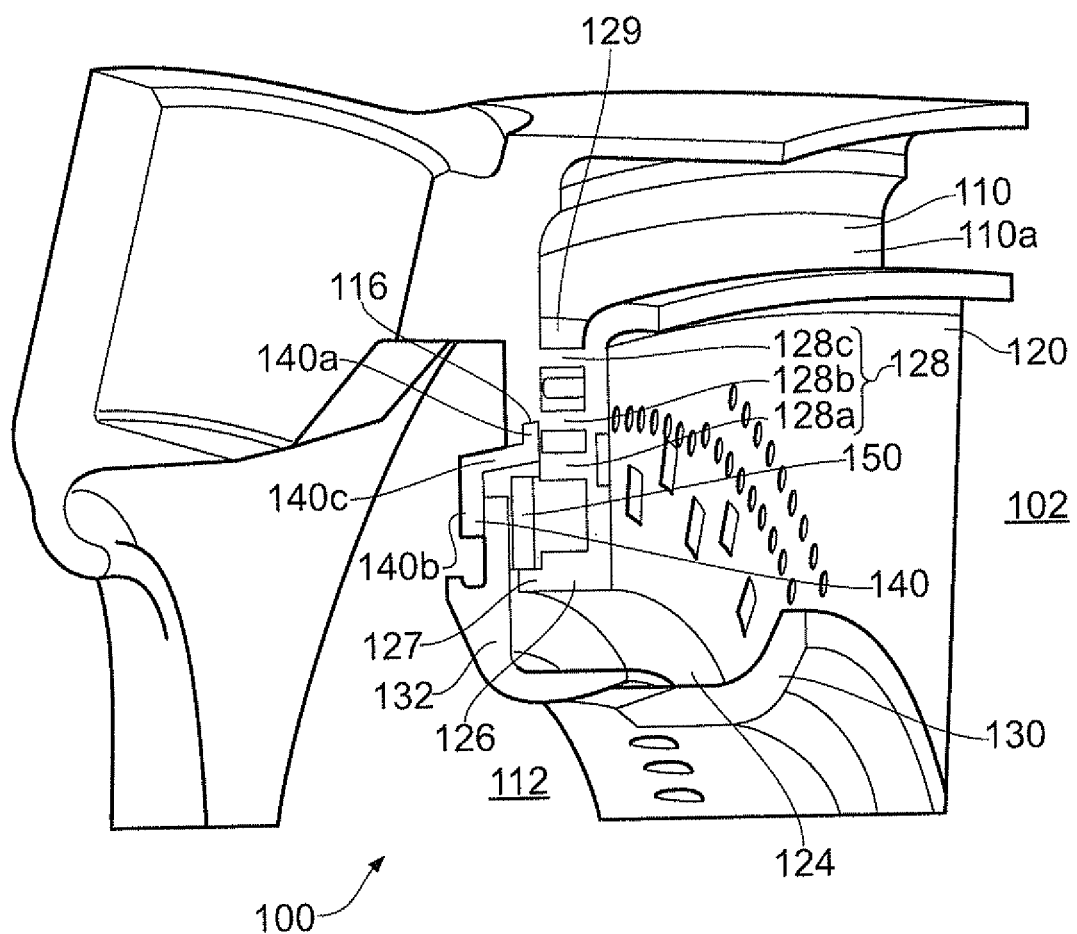
FIG. 2 shows a perspective cut away view of a head part of an annular combustion chamber according to an example of the present disclosure.

With reference to FIG. 2, a head part 100 of an annular gas turbine combustion chamber 102, according to an example of the present disclosure, may comprise an end wall or meter panel 110 which may act as a supporting and/or dividing wall for the combustion chamber 102 downstream of the end wall. The end wall 110 may comprise a passage opening 112 for accommodating a burner (not shown). The end wall 110 may comprise a substantially annular body disposed about a longitudinal axis of the gas turbine (not shown) and a plurality of burners may be provided equiangularly distributed about the end wall. To this extent, this annular combustion chamber corresponds to the known state of the art. Also in a known manner, several burners project in a circularly arranged manner into the annular combustion chamber, by way of which fuel as well as combustion air may be charged in a swirled manner into the combustion chamber.

The head part 100 may also comprise a heat shield 120 covering a back side 110a of the end wall 110 which faces towards the combustion chamber 102. The heat shield 120 may protect the end wall 110 from the hot burner gases and from an unacceptably high radiation effect. The heat shield 120 may comprise a sector of the annulus such that a plurality of the heat shields together form the annulus. The heat shield 120 may have an opening 124 for receiving the burner. The heat shield 120 may be fastened to the end wall 110 with securing means (not shown), e.g. bolts or studs and nuts.

The burner (not shown) may be surrounded by a seal or burner collar 130, which may ensure that a large portion of the combustion air flows into the combustion chamber 102 by way of the burner. Accordingly, the head part 100 may further comprise the burner collar 130 adapted to fit within the passage opening 112 of the end wall 110 and/or opening 124 of the heat shield 120.

The burner collar 130 may comprise a protruding portion 132, which may radially protrude from an outer surface of the burner collar 130. The protruding portion 132 of the burner collar 130 may extend about the perimeter of the burner collar 130. The protruding portion 132 of the burner collar 130 may define an annular rim.

The head part 100 may also comprise a first annular ring member 140 for receiving the protruding portion 132 of the burner collar 130. The first ring member 140 may be disposed about the circumference of the end wall passage opening 112. A radially outer portion 140a of the first ring member may engage with the end wall 110. By contrast, a radially inner portion 140b of the first ring member may engage the protruding portion 132 of the burner collar 130. The radially outer and inner portions 140a, 140b of the first ring member may be radially spaced apart. Accordingly, the engagements of the first ring member 140 with the end wall 110 and protruding portion 132 may also be radially spaced apart. An intermediate portion 140c of the ring member 140 may be provided between the radially outer and inner portions 140a, 140b of the first ring member. The intermediate portion 140c may extend in a direction with a component in the longitudinal, or axial, direction. (NB, the radial direction for the radially outer and inner portions 140a, 140b of the first ring member may be defined with respect to an axis of the end wall 110 passage opening 112.)

In an installed configuration a front facing side (i.e. facing away from the combustion chamber) of the first ring member 140 may rest on a back facing side (i.e. facing toward the combustion chamber) of the end wall 110. In addition, a front facing side of the burner collar 130 protruding portion 132 may rest against a back facing side of the first ring member 140. In other words the first ring member 140 may be in direct contact with the protruding portion 132 of the burner collar 130 and/or the end wall 110.

It follows from the above that the first ring member 140 may be provided between the burner collar 130 and the end wall 110. However, as depicted in FIG. 2, the radially inner portion 140b of the first ring member may be set back from the radially outer portion 140a of the first ring member. The radially inner portion 140b may be set back with respect to the back side 110a of the end wall 110, e.g. away from the combustion chamber 102. In other words, the first ring member 140 may first extend away form the combustion chamber side of the end wall 110 and then radially inwardly. Accordingly, the first ring member 140 may provide a surface set back from the remainder of the end wall 110 for the protruding portion 132 of the burner collar 130 to rest on.

The end wall 110 may comprise a recess 116 in the perimeter wall defining the passage opening 112. As such, the recess 116 may be disposed about the perimeter of the passage opening 112. The recess 116 may be provided on the back side 110a of the end wall 110 and adjacent to the passage opening 112. The recess 116 may be configured to receive the radially outer portion 140a of the first ring member 140. In other words the recess 116 and radially outer portion 140a may interlock and movement of the first ring member 140 in a direction away from the combustion chamber 102 may be limited.

The end wall 110 may be cast and the back side 110a of the end wall may not be machined smooth. The first ring member 140 may therefore provide a smooth flat surface for the burner collar 130 to rest on. The first ring member 140 may also provide a wearing surface for the burner collar 130 to rest on.

Although not shown, the first ring member 140 may have one or more openings to minimise its weight and/or provide cooling air, e.g. to the heat shield 120. The first ring member 140 may optionally be tack welded to the end wall 110 in order to assist assembly.

In addition to the first ring member 140, the head part 100 may comprise a second annular ring member 150. The second ring member 150 may be disposed between the protruding portion 132 of the burner collar and the heat shield 120. The second ring member 150 may be substantially planar. However, cooling air, e.g. from openings in the first ring member 140, may be directed to the heat shield 120 by the outer profile of the second ring member 150. Alternatively or additionally, the second ring member 150 may have one or more openings to provide cooling air to the heat shield 120. The first ring member 140 and second ring member 150 may be machined and/or laser cut to the required shape and/or smoothness.

The protruding portion 132 of the burner collar 130 may be held between the first and second ring members 140, 150. The second ring member 150 may in turn be held against the protruding portion 132 of the burner collar 130 by the heat shield 120. Accordingly, the burner collar 130 is held in place by the fixation of the heat shield 120 to the end wall 110. However, the first ring member 140 may only need to support the burner collar 130 when the gas turbine engine is stopped, since the gas pressure would urge the burner collar 130 rearward, e.g. towards the heat shield 120, when the engine is running.

The heat shield 120 may comprise a protruding portion 126 configured to hold the second ring member 150 against the protruding portion 132 of the burner collar and thus the burner collar 130 against the first ring member 140. The protruding portion 126 of the heat shield 120 may be shaped to cooperate with the second ring member 150. For example, the protruding portion 126 of the heat shield 120 may comprise a recess 127, which may be adapted to receive the radially innermost edge of the second ring member 150. The heat shield protruding portion 126 and/or recess 127 may be circumferentially disposed about the heat shield opening 124. By virtue of the cooperation between the protruding portion 126 and the second ring member 150, the second ring member 150 may be self locating with respect to the heat shield 120. Alternatively, the second ring member 150 may comprise a protruding portion at the radially innermost edge of the second ring member 150 and the protruding portion is circumferentially disposed about the heat shield opening 124 and locating on the radially innermost edge of the heat shield opening 124.

In addition to the protruding portion 126, the heat shield 120 may also comprise one or more further protruding portions 128a, 128b, 128c, which may be provided at radially increasing locations. The protruding portions 126, 128 may be circumferentially disposed about the heat shield opening 124. The protruding portions 126, 128 may together hold the remainder of the heat shield 130 away from the end wall 110 and/or second ring member 150 so that a gap 129 is provided therebetween.

To accommodate build tolerances and thermal growths the first ring member 140 and/or burner collar 130 may be configured to permit limited relative radial movement between the burner collar 130 and the end wall 110. For example, the diameter of the passage opening 112 may be greater than the diameter of the burner collar 130 protruding portion 132. More specifically, the diameter of the intermediate portion 140c of the ring member 140 may be greater than the diameter of the burner collar 130 protruding portion 132. Equally, the diameter of the heat shield opening 124 may be greater than the diameter of the burner collar 130 at the respective location when in the installed configuration. However, the diameter of the burner collar 130 protruding portion 132 may be greater than the minimum diameter of the radially inner portion 140b of the first ring member, thereby ensuring that, despite any radial movement, no gap may occur between the end wall 110 and the burner collar 130 protruding portion 132.

The burner collar 130 may be installed by placing the first ring member 140 within the recess 116 in the end wall 110. The protruding portion 132 of the burner collar 130 may then be placed on the radially inner portion 140b of the first ring member 140. Due to the arrangement of the present disclosure, the first ring member 140 and burner collar 130 may be inserted into the passage opening 112 from the combustion chamber 102 side of the end wall 110. The second ring member 150 may then be placed against the protruding portion 132 of the burner collar 130. The heat shield 120 may then be secured to the end wall 110 by virtue of the securing means and the protruding portion 132 may be held in place between the heat shield 120 and the radially inner portion 140b of the first ring member 140.

The present disclosure replaces both the cast end wall protruding portion and the first location ring of the prior art with a single ring member. Accordingly, the present disclosure advantageously reduces the cost and weight of the combustion chamber. The omission of the end wall protruding portion provides a significant weight saving. Moreover, by separating the radially outer portion of the ring member, which engages the end wall, and the radially inner portion of the ring member, which engages the burner collar, the weight of the burner collar and/or end wall can be reduced. By way of example, for a typical annular combustion chamber a weight reduction of approximately 418 grams has been estimated, which in the case of a jet engine is a significant saving.

The present disclosure also advantageously reduces the part count compared to other previously-proposed arrangements. For example, the location rings and burner seal retaining features of the other previously-proposed arrangements are eliminated. This also significantly reduces the cost and weight of the design. The head part of the present disclosure may also advantageously increase cooling air to the heat shield.

Furthermore, existing combustion chambers, e.g. in existing engines, may be retrofitted with the head part of the present disclosure.

I claim:

1. A head part of an annular combustion chamber for a gas turbine, the head part comprising:
   an end wall with a passage opening for accommodating a burner, the end wall comprising a back side which faces towards the combustion chamber;
   a burner collar adapted to fit within the passage opening and receive the burner, the burner collar comprising a protruding portion radially protruding from an outer surface of the burner collar; and
   a ring member in contact with the protruding portion of the burner collar on a back side surface of the ring member wherein the back side surface faces the combustion chamber, wherein:
   the head part of the annular combustion chamber is configured such that in an installed configuration a radially outer portion of the ring member is in direct contact with with the back side of the end wall and a radially inner portion of the ring member is in direct contact with the protruding portion of the burner collar; and
   the radially inner portion of the ring member is set back from the radially outer portion of the ring member, the radially inner portion being set back in a direction away from the combustion chamber with respect to the back side of the end wall.

2. The head part of an annular combustion chamber as claimed in claim 1, wherein the diameter of the end wall passage opening is greater than the burner collar protruding portion diameter.

3. The head part of an annular combustion chamber as claimed in claim 1, wherein the ring member is machined to have a smooth surface for receiving the protruding portion of the burner collar.

4. The head part of an annular combustion chamber as claimed in claim 1, wherein the ring member comprises one or more openings adapted to minimise the weight of the ring member and/or provide cooling air.

5. The head part of an annular combustion chamber as claimed in claim 1, wherein the head part further comprises a heat shield covering the back side of the end wall.

6. The head part of an annular combustion chamber as claimed in claim 5, wherein the head part comprises a further ring member, the further ring member being disposed between the protruding portion of the burner collar and the heat shield.

7. The head part of an annular combustion chamber as claimed in claim 1, wherein the end wall comprises a recess on the back side of the end wall and adjacent to the passage opening, the recess being configured to engage the radially outer portion of the ring member.

8. The head part of an annular combustion chamber as claimed in claim 1, wherein in the installed configuration the protruding portion of the burner collar is in direct contact with the ring member.

9. The head part of an annular combustion chamber as claimed in claim 1, wherein the protruding portion of the burner collar extends about the perimeter of the burner collar.

10. The head part of an annular combustion chamber as claimed in claim 1, wherein the burner collar is inserted from the combustion chamber side of the end wall.

11. The head part of an annular combustion chamber as claimed in claim 1, wherein the ring member and/or burner collar are configured to permit relative radial movement between the burner collar and the end wall.

12. A combustion chamber comprising the head part of the annular combustion chamber as claimed in claim 1.

13. A gas turbine engine comprising the head part of the annular combustion chamber as claimed in claim 1.

14. A method of installing a burner collar of a head part of an annular combustion chamber for a gas turbine, the head part comprising:
   an end wall with a passage opening for accommodating a burner;
   the burner collar adapted to fit within the passage opening and receive the burner, the burner collar comprising a protruding portion radially protruding from an outer surface of the burner collar; and
   a ring member in contact with the protruding portion of the burner collar on a back side surface of the ring member wherein the back side surface faces the combustion chamber;
   wherein the method comprises;
   engaging the back side of the end wall in direct contact with a radially outer portion of the ring member; and
   engaging the protruding portion of the burner collar in direct contact on a radially inner portion of the ring member, the radially inner portion of the ring member being set back in a direction away from the combustion chamber from the radially outer portion of the ring member with respect to the back side of the end wall.

* * * * *